3,350,207
CONTINUOUS BREAD MAKING PROCESS WITH PUMPABLE SHORTENING CONTAINING A HIGH LEVEL OF FATTY TRIGLYCERIDE SOLIDS
Paul M. Koren, Cincinnati, and James H. Menzies, Springfield Township, Ohio, assignors to The Procter & Gamble Company, Cincinnati, Ohio, a corporation of Ohio
No Drawing. Filed Aug. 3, 1964, Ser. No. 387,217
7 Claims. (Cl. 99—90)

ABSTRACT OF THE DISCLOSURE

Bread is prepared by a continuous process utilizing a hot melted pumpable shortening which is in pumpable condition at normally encountered temperatures and which contains from about 10% to about 60% of fatty triglyceride solids.

---

This invention relates to an improved method for making bread by the so-called continuous bread making process; more particularly, this invention relates to the use of a melted shortening which is in pumpable condition at normally encountered temperatures containing 10 percent or more by weight of substantially fully saturated fatty triglyceride solids in an apparatus suitable for continuous mixing and development of bread dough.

The practice of making commercial bread by the batch dough and sponge dough processes has been replaced, in many instances, by a more expedient method for manufacturing bread dough which is continuous from the point at which the dough ingredients are initially mixed until such time as the dough is placed in pans, finally proofed and readied for the oven. The continuous process has eliminated the need for the divider, rounder, overhead proofer and molder customarily employed in the straight dough and sponge dough processes. The elimination of these pieces of apparatus and their attendant functions has greatly reduced the time required for preparing bread dough; whereas six to seven hours were once required to process dough ingredients by the batch dough or sponge dough processes, the processing of continuously prepared bread dough can be completed in about one and one-half hours, including the time required for final proofing. The portion of this time essential to mixing and developing the dough is approximately three minutes.

In the United States, two continuous mixing systems are now employed in the large commercial bakeries. Although the equipment for carrying out these processes differs somewhat in mechanical detail, both processes are substantially similar in that they include a pre-mixer (or incorporator) and a high speed developer.

The basic process for continuously manufacturing bread is described by Baker in U.S. Patent 2,953,460, issued Sept. 20, 1960. The Baker process is essentially a two stage mixing operation: In the first mixing stage, the dough ingredients, either in the form of the entire quantity of flour, salt, sugar, milk solids, shortening, oxidants and fermented yeast brew or in the form of a pre-established sponge together with additional flour, water, salt and other supplemental ingredients, are thoroughly blended in a pre-mixer which fully wets and combines all of the dough ingredients to yield a uniformly mixed dough which is essentially undeveloped; in the second mixing stage, the dough ingredients are developed in a high speed developer into a dough suitable for baking, after proofing, without further mixing or working. It is the second step, the developing or high speed mixing step, which makes the continuous bread making process particularly unique.

Lard or vegetable shortening that is solid or semi-solid at normally encountered temperatures is employed to shorten bread produced by the continuous process. Because these shortenings are in a non-fluid plastic condition at normally encountered temperatures they are difficult to handle, transport and store. A solid or semi-solid lard or vegetable shortening having a softening point of at least 110° F. is used in the continuous process because the plastic properties of such shortenings have been deemed essential to working the warm (i.e., between 100° F. and 110° F.) continuously mixed doughs. In the continuous process for manufacturing bread, lard is the most commonly employed shortening.

The plastic properties of the solid or semi-solid lard or vegetable shortening are usually modified by the baker just prior to use in the continuous bread making process by the baker's addition to the shortening of small amounts of "hardflakes"; for example, about three to five percent by weight of the shortening of flakes of fully hydrogenated lard or cottonseed oil having a melting point of about 140° F. It is also not uncommon for such bakery blended shortenings to include the permitted bread emulsifiers; for example, mono- and diglycerides, tartaric acid esters, etc. In choosing a suitable shortening composition, the baker must take into consideration the variations which occur in the other ingredients of the dough, particularly in the flour, and in the shortening itself, especially when the shortening is lard. The baker must vary the quantity of hardflakes and emulsifiers as the consistency of the solid or semi-solid shortening varies.

Since the particular properties of solid or semi-solid lard or vegetable shortening have heretofore been considered essential to the production of bread in a continuous mixing system, it has been necessary to provide the continuous mixing systems with a heating means for melting the solid or semi-solid shortening and maintaining the shortening in a hot melted condition at a temperature of at least 120° F. in order to insure that the shortening is properly introduced and metered into the first mixing stage. This heating means is essential to the practice of the present invention.

While the continuous bread making process has many commercial advantages, certain problems have been encountered in the continuous mixing of bread dough which are attributable in whole or in part to the conventionally employed lard or vegetable shortenings. Many of these problems are well recognized; they are more fully described in co-pending application Ser. No. 238,727 filed Nov. 19, 1962, now U.S. Patent 3,272,634.

One of the problems of continuous bread making for which an adequate solution has not heretofore been found is the problem of dough stability. The doughs produced by the continuous bread making equipment using conventional dough formulations tend to be unstable. Stable doughs are essential to the practical operation of a continuous mixing system since it is not always possible when handling large quantities of dough to avoid completely certain abuses such as the bumping of bread pans containing freshly proofed dough. An unstable freshly proofed dough which is jarred or bumped will collapse and as a result become a so-called "crippled" loaf which cannot be sold. The number of crippled loaves can be substantially reduced, if not eliminated, by insuring that the dough is sufficiently stable to tolerate some abuse, including bumping and jarring, without significant collapse. For the purposes of this invention, a stable dough is a dough which when proofed will collapse no more than 0.30 inch in the standard bumping test described in Example 1. The test is a reliable measure of the strength of the cell structure of the bread dough.

It is an object of the present invention to improve the continuous bread making process by providing a method for increasing the dough stability of the proofed loaves. It is a further object of this invention to provide a process for using a melted pumpable shortening in the continuous bread making process in amounts which are smaller than those amounts of lard or conventional vegetable shortening heretofore required. It is another object of this invention to improve the handling characteristics of continuously produced dough without impairing the "mouth-feel" of the finished bread product. It is a still further object of the present invention to improve the continuous bread making process by providing a shortening composition in a pumpable condition at normally encountered temperatures for use in the continuous process which is convenient to handle, transport and store and which eliminates the necessity for blending shortening compositions in the bakery. And, it is a still further object of the present invention to produce continuous mix bread which slices easily in automatic bread slicing equipment. These and other objects are achieved by the use in the continuous bread making process of a pumpable shortening in a melted condition comprising a suspension in a liquid glyceride vehicle of from 10 percent to about 60 percent by weight of the shortening of substantially fully saturated fatty glyceride solids, said solids being trisaturated triglycerides of fatty acids having from 16 to 22 carbon atoms. When the total number of fatty triglyceride solids exceeds 10 percent by weight of the shortening, the shortening can also include minor proportions of solid mono- and diglycerides of fatty acids having from 16 to 22 carbon atoms. These fatty glyceride solids must be dispersed in the liquid glyceride vehicle in such manner and in such a form that the shortening remains in a pumpable condition over the normal range of handling temperatures and does not form a rigid non-fluid plastic shortening. Methods for preparing shortenings of this nature are described in U.S. Patents 2,521,219 and 2,521,242, both issued Sept. 5, 1950 and U.S. Patent 2,815,286, issued Dec. 3, 1957. The techniques for making pumpable non-plastic shortenings disclosed in these patents are important to the present invention; not the proportions of fatty glyceride solids in liquid glyceride vehicles which are taught therein. The essence of the present invention resides in the discovery that if at least 10 percent by weight of a melted pumpable shortening is substantially fully saturated fatty triglyceride solids, the handling characteristics of continuously mixed bread dough, particularly the stability of the dough, are markedly improved without adverse effects upon the other characteristics of the finished bread. Although emulsifiers such as solid mono- and diglycerides can be present in the shortening, the improved dough stability is a function of the high level of substantially fully saturated fatty triglyceride solids.

In composing the shortenings for use in the instant process, any of the usual liquid triglyceride oils can be employed as a suitable vehicle if the oil is chemically stable and resistant to oxidation. Oils derived from naturally occurring liquid glyceride oils such as cottonseed oil, soybean oil, peanut oil, rapeseed oil, sesame seed oil and sunflower seed oil are very suitable vehicles. Also suitable are liquid oil fractions obtained from palm oil, lard, and tallow, as, for example, by graining or directed interesterification, followed by separation of the oil. Oils predominating in glycerides of unsaturated acids may require some hydrogenation to maintain flavor, but the hydrogenation should be kept to a minimum. Also suitable are the so-called low molecular synthetic fats which are certain di- or triglycerides in which one of two of the hydroxyl groups of the glycerine have been esterified with acetic, propionic, butyric, or caproic acids, and one or two of the remaining hydroxyl groups of the glycerine have been esterified with higher molecular weight fatty acids having from 12 to 22 carbon atoms. Any mixture of the above enumerated liquid triglyceride vehicles can be used in composing shortenings for use in the process of the present invention.

The triglyceride solids which are suspended in the liquid glyceride vehicle are substantially fully saturated fatty triglycerides having from 16 to 22 carbon atoms. Preferably, these fatty triglyceride solids have an iodine value not greater than about 12. Suitable fatty triglyceride solids include tristearin, tripalmitin and other normally solid triglycerides such as palmito distearin or mixtures thereof. Substantially completely saturated triglycerides made by hydrogenating animal or vegetable oils such as cottonseed oil, sunflower seed oil, linseed oil, hazelnut oil, soybean oil, peanut oil, olive oil, corn oil, palm oil, lard, tallow and mixtures thereof are also suitable.

As previously indicated, certain emulsifier solids such as fatty mono- and diglycerides can also be present in the shortenings; however, the presence of these emulsifiers is optional and is not essential to the practice of this invention. Useful fatty mono- and diglyceride emulsifier solids having an iodine value not greater than about 12 can be derived from any suitable source including those animal and vegetable oils enumerated above as sources of the fatty triglyceride solids. The emulsifier solids are suspended in the liquid glyceride vehicle along with the substantially fully saturated fatty triglyceride solids. At least about 0.8 percent by weight of the shortening of fatty mono- and diglyceride solids is necessary before the effect of the emulsifier is apparent; up to about 12 percent by weight of the shortening of emulsifier solids is not detrimental to the bread when used in conjunction with the high level of trisaturated triglyceride solids specified herein. However, only a small contribution to the finished bread product can be attributed to the presence of any emulsifier solids in amounts exceeding about 6 percent by weight of the shortening.

Certain useful mixtures of fatty mono-, di- and triglyceride solids can be prepared by superglycerinating substantially completely saturated triglycerides, analyzing the mixture and then adjusting the resultant composition, if necessary, by adding appropriate amounts of substantially fully saturated triglycerides to obtain the ratio of fatty mono-, di- and triglyceride solids sufficient to insure that at least 10 percent by weight of the shortening is trisaturated triglycerides.

To achieve the benefits of this invention, the pumpable shortenings must be used in a hot melted condition generally at a temperature of at least about 140° F. At this temperature or, if required, at a temperature which is higher, the fatty triglyceride solids are completely melted and, therefore, are easily dispersed throughout the dough. No more than 3.0 percent by weight of the flour in the dough of shortening is required since the sought-after improvement in dough stability is most readily observed when less than 2.8 percent shortening by weight of the flour in the dough is used. Still smaller quantities of shortening are preferred and an amount of about 2.0 percent by weight of the flour in the dough is most highly preferred. At this level, an optimum improvement in dough stability is realized. This level of shortening is materially smaller than the amount of shortening ordinarily required in the continuous bread making process.

To insure that the proper use of melted pumpable shortenings containing a high level of fatty triglyceride solids in the continuous bread making process is fully understood, the operation of a typical continuous system will be fully explained. A liquid "broth" or "brew" containing yeast, water, sugar, salt, milk solids, yeast nutrients, a portion of the flour and other minor ingredients is first prepared, and is permitted to ferment until there has been an adequate conversion of the sugar to carbon dioxide and ethanol. After the brew has been properly fermented, the brew and the other dough ingredients are continuously delivered in metered proportions to the first mixing stage where they are continuously mixed. The other dough ingredients which are combined in this stage with the brew include flour and minor dry ingredients; i.e., oxidants, generally a solution of potassium bromate and potassium iodate; and melted pumpable shortening.

The resulting mixture is passed through the first mixing stage to produce a pre-mixed dough having substantially uniform properties. The dough is thereafter subjected to high speed mixing to develop a complete dough suitable for extruding and cutting into proper dough sections which are automatically panned, the pans being conveyed to a final proofing room where the dough is proofed before it is baked in the conventional manner.

The process of the present invention is more fully illustrated in the following examples.

Example 1

A brew was prepared by mixing the ingredients set forth below in a jacketed stainless steel tank. The ingredients in the brew were slowly agitated during the fermentation period to avoid aeration. The brew was fermented at 90° F. for about two and one-half to three hours.

| Brew Ingredients | Pounds per tank | Concentration as percent of total flour content |
|---|---|---|
| Water | 60.00 | 53.60 |
| Sugar | 10.00 | 8.80 |
| Salt | 2.20 | 1.93 |
| Milk solids | 1.50 | 1.32 |
| Yeast foods | 0.75 | 0.66 |
| Yeast | 3.25 | 2.85 |
| Flour | 15.00 | 13.20 |
| Monocalcium phosphate | 0.14 | 0.12 |
| Calcium propionate | 0.09 | 0.08 |

After the brew was fermented it was cooled to about 75° F. and mixed with the ingredients set forth below to produce a bread dough. Mixing of the brew and the dough ingredients was carried out in a Hobart mixer using a dough hook. Initial mixing was conducted at a low speed (50 r.p.m.) for about 10 seconds; thereafter the ingredients were uniformly admixed at a high speed (90 r.p.m.) for about 45 seconds. The temperature of the dough after mixing was about 78° F.

| Dough Ingredients | In mixer | Concentration as percent of total flour content |
|---|---|---|
| Brew, pounds | 10.5 | 81.5 |
| Flour, pounds | 11.2 | 86.8 |
| Water, pounds | 2.0 | 15.6 |
| Oxidant solution: | | |
| Potassium iodate, p.p.m. | 10 | 65 |
| Potassium bromate, p.p.m. | 55 | |

Shortenings having the compositions given in Table I were heated to a temperature of at least 140° F. and added to the brew along with the other above-enumerated ingredients at a level of 2.0 percent based on the weight of the flour in the dough.

The dough was developed in a developer of the type described in Baker, U.S. Patent 2,953,460, at a mixing speed of 228 r.p.m. and a power input of 0.38 H.P./min./lb.; the dough pump speed was 4.0 lbs./min. The outlet temperature of the developed dough was about 105° F.

The developed dough was extruded from the developer and scaled into 3.5 x 7.5 x 2.5 inch bread pans; the average weight of the dough pieces was 390 grams. After proofing in an electric proof box for about 50 minutes at about 100° F. and at a relative humidity of about 80 percent, the pans of bread dough were baked in a rotating oven for about 20 minutes at 450° F.

The baked bread was cooled for at least one hour before the volume was measured and before the loaves were sliced. Other evaluations of the bread were made after the sliced bread had been wrapped in a polyethylene bag and held at normal room temperature for twenty-four hours.

In this particular example shortenings containing 10 percent or more of substantially fully saturated triglyceride solids were compared with shortenings containing smaller amounts of these solids. The compositions of these shortenings as well as the comparative results of their performance are reported in Table I. The number of runs referred to in Table I is the number of batches of bread baked with each shortening; three or more loaves of bread were prepared in each batch. The figures reported in Table I are the average evaluation figures for the number of runs indicated.

TABLE I

| | | | | | | |
|---|---|---|---|---|---|---|
| Substantially fully saturated fatty triglyceride solids derived from substantially fully hydrogenated soybean oil having an I.V. of 8 (percent by weight) | 5 | 8 | 10 | 15 | 20 | 40 |
| Mono- and diglyceride emulsifier solids derived from soybean oil having an I.V. of 8 (percent by weight) | 4 | 4 | 4 | 4 | 4 | 4 |
| Refined, bleached and deodorized soybean oil having an I.V. of 107 (percent by weight) | 91 | 88 | 86 | 81 | 76 | 56 |
| Number of runs | 15 | 1 | 9 | 4 | 2 | 14 |
| Specific volume (cm.³/gm.) | 6.02 | 6.26 | 5.91 | 5.90 | 6.05 | 5.97 |
| Dough stability (drop in inches) | .76 | .40 | .24 | .14 | .27 | .28 |
| Grain | 7.76 | 8.00 | 8.04 | 8.50 | 8.00 | 7.93 |
| Mouth-feel | 96.07 | 7.00 | 11.11 | 11.49 | 12.00 | 13.00 |

The grain of the baked loaves was graded on a scale of 1 to 10 by comparison with standard photographs. Mouth-feel was judged by a bread expert on a scale of 1 to 20 according to the following increments of evaluation:

0—very poor—very tough and rubbery
5—poor—very tough, gummy and very doughy
10—good—slightly gummy and slightly doughy
15—very good—slightly doughy but loses gumminess in the mouth
20—excellent—only very slightly doughy, tender, and not gummy Other properties of the finished bread such as resilience; slicing including resistance to crushing during slicing and crumb appearance after slicing; flavor; and aroma were all judged by a bread expert and found to be satisfactory.

Stability of the bread dough was determined and graded in the following manner: after proofing, but before baking, the bread pans containing the proofed dough were subjected to a standardized bumping test. This test was carried out by placing the bread pan in a positively located jig and striking the pan with a weighted pendulum which had been withdrawn from the side of the pan to a pre-determined height. The height of the proofed dough in the bread pan was measured, both before and after striking of the pan by the weighted pendulum. The drop in the height of the dough after striking of the pan was recorded. The average drop in inches of the tested loaves is reported in Table I. A drop of more than 0.30 inch indicates an unstable dough since this drop in the height of the proofed dough results in a substantially smaller loaf than normal. A dough which drops 0.70 inch in this test produces a "crippled" loaf when baked.

The results of this example show that a content of at least 10 percent by weight of the melted pumpable shortening of fatty triglyceride solids is essential to obtain a stable dough. Only in those instances wherein the pumpable shortening contained 10 percent by weight or more of fatty triglyceride solids was the dough stability less than 0.30 inch. The example further shows that dough stability can be obtained by using the improved process of this invention without a material sacrifice in the other properties of the bread and with an improvement in mouth-feel.

Example 2

Unheated shortenings having the compositions reported in Table II were used at room temperature (about 80° F.) to prepare bread in the manner set forth in Example 1. In each instance the shortenings were added to the dough in amounts equivalent to 2.0 percent by weight of the total flour in the dough. The results reported in Table II show that there is no significant difference in dough stability between unheated shortenings containing 10 percent or more by weight of substantially fully saturated triglyceride solids and unheated shortenings containing lower levels of these solids. In each run, the dough stability was greater than 0.30 inch, the maximum average drop in inches of a stable dough in the standard bump test.

TABLE II

| | | | |
|---|---|---|---|
| Substantially fully saturated fatty triglyceride solids derived from substantially fully hydrogenated soybean oil having an I.V. of 8 (percent by weight) | 5 | 10 | 40 |
| Mono- and diglyceride emulsifier solids derived from soybean oil having an I.V. of 8 (percent by weight) | 4 | 4 | 4 |
| Refined, bleached and deodorized soybean oil having an I.V. of 107 (percent by weight) | 91 | 86 | 56 |
| Number of runs | 5 | 2 | 11 |
| Specific volume (cm.³/gm.) | 6.25 | 6.15 | 6.04 |
| Dough stability (drop in inches) | .90 | 0.70 | 0.86 |
| Grain | 7.81 | 7.25 | 7.31 |
| Mouth-feel | 7.20 | 10.00 | 10.45 |

A comparison of the results of Examples 1 and 2 indicate that the stability of continuous mix bread dough is improved when pumpable shortenings containing at least 10 percent by weight of substantially fully saturated fatty triglyceride solids are heated to at least 140° F. prior to use.

Example 3

Example 1 was repeated using 2.0 percent by weight of the total flour of shortenings heated to at least 140° F. containing 10 percent or more by weight of substantially fully saturated fatty triglyceride solids; however, in this example the fatty mono- and diglyceride emulsifiers were eliminated. The following results were achieved:

TABLE III

| | | | | |
|---|---|---|---|---|
| Substantially fully saturated fatty triglyceride derived from substantially fully hydrogenated soybean oil having an I.V. of 8 (percent by weight) | 10 | 15 | 20 | 40 |
| Mono- and diglyceride emulsifier solids derived from soybean oil having an I.V. of 8 (percent by weight) | | | | |
| Refined, bleached and deodorized soybean oil having an I.V. of 107 (percent by weight) | 90 | 85 | 80 | 60 |
| Number of runs | 1 | 2 | 1 | 3 |
| Specific volume (cm.³/gm.) | 6.22 | 6.25 | 5.94 | 5.97 |
| Dough stability (drop in inches) | .10 | .22 | .15 | .25 |
| Grain | 8.50 | 8.25 | 8.00 | 7.50 |
| Mouth-feel | 8.00 | 10.00 | 10.00 | 12.67 |

The results reported in Table III show that the presence of emulsifier solids in the melted pumpable shortenings is not essential to dough stability.

Example 4

Using the dough recipe and procedures of Example 1, a shortening heated to at least 140° F. containing 5 percent by weight of substantially fully saturated fatty triglyceride solids and 4 percent by weight emulsifier solids was compared with a melted shortening heated to at least 140° F. containing 10 percent by weight of substantially fully saturated fatty triglyceride solids and 4 percent by weight emulsifier solids. In both cases the amount of shortening which was used was 3.0 percent by weight of the total flour in the dough. The results reported in Table IV show that the dough stability of the bread prepared with these shortenings is substantially the same. It is apparent from this example that the improved dough stability achieved with the process of this invention is not apparent when the melted shortening containing a high level of fatty triglyceride solids is 3.0 percent by weight of the flour in the dough.

TABLE IV

| | | |
|---|---|---|
| Substantially fully saturated fatty triglyceride solids derived from substances fully hydrogenated soybean oil having an I.V. of 8 (percent by weight) | 5 | 10 |
| Mono- and diglyceride emulsifier solids derived from soybean oil having an I.V. of 8 (percent by weight) | 4 | 4 |
| Refined, bleached and deodorized soybean oil having an I.V. of 107 (percent by weight) | 91 | 86 |
| Number of runs | 3 | 5 |
| Specific volume (cm.³/gm.) | 5.73 | 5.91 |
| Dough stability (drop in inches) | .30 | .30 |
| Grain | 8.67 | 8.20 |
| Mouth-feel | 9.33 | 9.41 |

Example 5

Following the procedures set forth in Example 1, two batches of continuous bread were prepared. In these batches the shortening contained no fatty triglyceride solids but did contain mono- and diglyceride emulsifier solids. In the first instance the shortening was composed of 9 percent emulsifier solids having an I.V. of 8 and 91 percent refined, bleached and deodorized soybean oil having an I.V. of 107. In the second instance the shortening was composed of 15 percent emulsifier solids having an I.V. of 8 to 85 percent refined, bleached and deodorized soybean oil having an I.V. of 107. In both instances, the emulsifier solids were substantially fully saturated mono- and diglycerides derived from soybean oil. Both doughs were unstable as shown in Table V; the dough containing the shortening having 15 percent emulsifier solids was exceptionally unstable. Thus, dough stability is not a function of the emulsifier solids.

TABLE V

| | | |
|---|---|---|
| Fully saturated fatty triglyceride solids derived from substantially fully hydrogenated soybean oil having an I.V. of 8 (percent by weight) | | |
| Mono- and diglyceride emulsifier soilds derived from soybean oil having an I.V. of 8 (percent by weight) | 9 | 15 |
| Refined, bleached and deodorized soybean oil having an I.V. of 107 (percent by weight) | 91 | 85 |
| Number of runs | 1 | 1 |
| Specific volume (cm.³/gm.) | 5.34 | 5.84 |
| Dough stability (drop in inches) | .50 | 1.80 |
| Grain | 5.00 | 6.50 |
| Mouth-feel | 10.00 | 10.00 |

Although the bread produced in the continuous system and illustrated in these examples is largely standard white bread, the pumpable shortenings herein described can be equally well employed to produce other types of continuous mix bread; for example, whole wheat and rye breads.

It will be apparent to those skilled in the art that variations and modifications of the present process invention can be made upon the study of the foregoing disclosure. Such variations and modifications are intended to be within the spirit and scope of this invention as defined in the appended claims.

What is claimed is:
1. In a process for the continuous production of bread comprising the steps of mixing a fermented yeast brew, continuously mixing the brew in a first mixing stage with other dough ingredients including a shortening ingredient as hereinafter defined, passing the resulting mixture through the first mixing stage to produce a pre-mixed dough having substantially uniform properties and thereafter subjecting the pre-mixed dough to high speed mixing to develop a complete dough suitable for extruding and cutting into dough sections, panning, proofing, and baking, the improvement which comprises continuously introducing to the first mixing stage a pumpable shortening ingredient at a temperature of at least about 140° F., said shortening being in pumpable condition at normally encountered temperatures and comprising a suspension in a liquid glyceride vehicle of from about 10 percent to about 60 percent by weight of shortening of substantially fully saturated fatty triglyceride solids of fatty acids having from 16 to 22 carbon atoms, the amount of said shortening added at the first mixing stage being an amount of about 2.0 to not more than 2.8 percent based on the weight of the flour content in the dough.

2. The process of claim 1 wherein the liquid glyceride vehicle is derived from a fatty material selected from the group consisting of cottonseed oil, soybean oil, peanut oil, rapeseed oil, sesame seed oil, sunflower seed oil, palm oil, lard, low molecular synthetic fats, and mixtures thereof, and wherein the substantially fully saturated fatty triglyceride solids are derived from fatty materials selected from the group consisting of cottonseed oil, sunflower seed oil, linseed oil, hazelnut oil, soybean oil, peanut oil, olive oil, corn oil, palm oil, lard, tallow and mixtures thereof.

3. The process of claim 1 wherein the liquid glyceride vehicle is derived from soybean oil and the substantially fully saturated fatty triglyceride solids are derived from soybean oil.

4. The process of claim 1 wherein the shortening ingredient contains from about 0.8 percent to about 12.0 percent by weight of shortening of fatty mono- and diglyceride solids having from 16 to 22 carbon atoms derived from fatty materials selected from the group consisting of cottonseed oil, sunflower seed oil, linseed oil, hazelnut oil, soybean oil, peanut oil, olive oil, corn oil, palm oil, lard, tallow and mixtures thereof.

5. In a process for the continuous production of bread comprising the steps of mixing a fermented yeast brew, continuously mixing the brew in a first mixing stage with other dough ingredients including a shortening ingredient as hereinafter defined, passing the resulting mixture through the first mixing stage to produce a pre-mixed dough having substantially uniform properties and thereafter subjecting the pre-mixed dough to high speed mixing to develop a complete dough suitable for extruding and cutting into dough sections, panning, proofing, and baking, the improvement which comprises continuously introducing to the first mixing stage a pumpable shortening ingredient at a temperature of at least about 140° F., said shortening being in pumpable condition at normally encountered temperatures and comprising a suspension in a liquid glyceride vehicle of from about 10 percent to about 60 percent by weight of shortening of substantially fully saturated fatty triglyceride solids of fatty acids having from 16 to 22 carbon atoms having an iodine value not greater than 12 and from about 0.8 percent to about 12.0 percent by weight of shortening of substantially fully saturated fatty mono- and diglyceride solids of fatty acids having from 16 to 22 carbon atoms having an iodine value not greater than 12, the amount of said shortening added at the first mixing stage being about 2.0 percent based on the weight of the flour content in the dough.

6. The process of claim 5 wherein the liquid glyceride vehicle is derived from a fatty material selected from the group consisting of cottonseed oil, soybean oil, peanut oil, rapeseed oil, sesame seed oil, sunflower seed oil, palm oil, lard, low molecular synthetic fats, and mixtures thereof, and wherein the substantially fully saturated fatty mono-, di- and triglyceride solids are derived from fatty materials selected from the group consisting of cottonseed oil, sunflower seed oil, linseed oil, hazelnut oil, soybean oil, peanut oil, olive oil, corn oil, palm oil, lard, tallow and mixtures thereof.

7. The process of claim 5 wherein the liquid glyceride vehicle is derived from soybean oil and the substantially fully saturated fatty mono-, di- and triglyceride solids are derived from soybean oil.

No references cited.

A. LOUIS MONACELL, *Primary Examiner.*

J. M. GOLIAN, *Assistant Examiner.*